US011203118B1

(12) United States Patent
McDowall et al.

(10) Patent No.: US 11,203,118 B1
(45) Date of Patent: Dec. 21, 2021

(54) SYSTEMS AND METHODS TO IMPLEMENT PREFERRED PATHWAYS IN MOBILE ROBOTS

(71) Applicant: A.9com, Palo Alto, CA (US)

(72) Inventors: Karl McDowall, Boulder, CO (US); Nima Keivan, Boulder, CO (US); Andrew E. Hoffman, Morrison, CO (US); David Hastings Kerr, Boulder, CO (US); Joshua Bavari, Boulder, CO (US)

(73) Assignee: A9.COM, Palo Alto, CA (US)

( * ) Notice: Subject to any disclaimer, the term of this patent is extended or adjusted under 35 U.S.C. 154(b) by 166 days.

(21) Appl. No.: 16/438,582

(22) Filed: Jun. 12, 2019

Related U.S. Application Data

(60) Provisional application No. 62/683,906, filed on Jun. 12, 2018.

(51) Int. Cl.
*G05B 19/042* (2006.01)
*B25J 9/16* (2006.01)
*B25J 9/00* (2006.01)

(52) U.S. Cl.
CPC ........... *B25J 9/1666* (2013.01); *B25J 9/0084* (2013.01)

(58) Field of Classification Search
CPC ........ G05B 19/042; G05B 2219/37537; Y02P 90/80; B60R 2300/406; B64C 2201/146; B25J 11/008; B25J 13/006; B25J 13/089; B25J 19/005; B25J 9/1661; G06N 20/00; H04W 4/38
See application file for complete search history.

(56) References Cited

U.S. PATENT DOCUMENTS

| 9,701,012 | B1 * | 7/2017 | Theobald | G05B 19/41815 |
| 10,012,996 | B1 * | 7/2018 | Canoso | G05D 1/0274 |
| 2007/0100496 | A1 * | 5/2007 | Forell | G05D 1/024 700/245 |

(Continued)

OTHER PUBLICATIONS

Siegwart et al. Planning and Navigation, 2011, IEEE, p. 369-423 (Year: 2011).*

(Continued)

*Primary Examiner* — Mcdieunel Marc
(74) *Attorney, Agent, or Firm* — Eversheds Sutherland (US) LLP

(57) ABSTRACT

Systems, methods, and computer-readable media are disclosed for systems and methods to implement preferred pathways in mobile robots. Example methods may include obtaining, via at least one of a user interface and a corresponding Application Programming Interface API call, at least one preferred pathway for an autonomous mobile robot, transmitting the at least one preferred pathway to the autonomous mobile robot, generating a planned path for the autonomous mobile robot based at least in part on an influence function, the influence function being representative of an amount of bias towards the at least one preferred pathway on a motion planning decision of the autonomous mobile robot, the amount of bias being based at least in part on a metric associated with the at least one preferred pathway, and causing the autonomous mobile robot to move from a start point to an end point along the planned path.

20 Claims, 11 Drawing Sheets

(56) References Cited

U.S. PATENT DOCUMENTS

| | | | | |
|---|---|---|---|---|
| 2013/0085625 A1* | 4/2013 | Wolfe | ................... | G06F 19/00 |
| | | | | 701/1 |
| 2014/0207282 A1* | 7/2014 | Angle | ................... | G05B 15/02 |
| | | | | 700/257 |
| 2017/0075348 A1* | 3/2017 | Kratz | ................... | G05D 1/0038 |
| 2017/0356751 A1* | 12/2017 | Iagnemma | ......... | G01C 21/3691 |
| 2021/0078172 A1* | 3/2021 | Cao | ................... | G06F 3/04847 |

OTHER PUBLICATIONS

Duan et al., An immunity algorithm for path planning of the autonomous mobile robot, 2004, IEEE, p. 1-5 (Year: 2004).*
Matta et al., Development of an efficient perception system and a path planning algorithm for autonomous mobile robots, 2013, IEEE, p. 1-8 (Year: 2013).*
Mano et al., Autonomous generation of behavioral trace maps using rescue robots, 2009, IEEE, p. 2809-2814 (Year: 2009).*

\* cited by examiner

SYSTEMS AND METHODS TO IMPLEMENT PREFERRED PATHWAYS IN MOBILE ROBOTS

CROSS-REFERENCE TO RELATED APPLICATION

This application claims the benefit of U.S. Provisional Application No. 62/683,906, filed Jun. 12, 2018, which is incorporated by reference in its entirety.

BACKGROUND

Robots may be used to assist humans with various tasks. For example, certain types of robots may be used to pick up or transport items, whereas other types of robots may be used to pack and ship items. Some robots may be configured to drive or otherwise move autonomously or semi-autonomously. Such robots may navigate from a first location to a second location. However, during transit, mobile robots may encounter previously unknown obstacles, thereby rendering a certain pathway unusable. Accordingly, systems and methods to implement preferred pathways for mobile robots may be desired.

Figure 1:
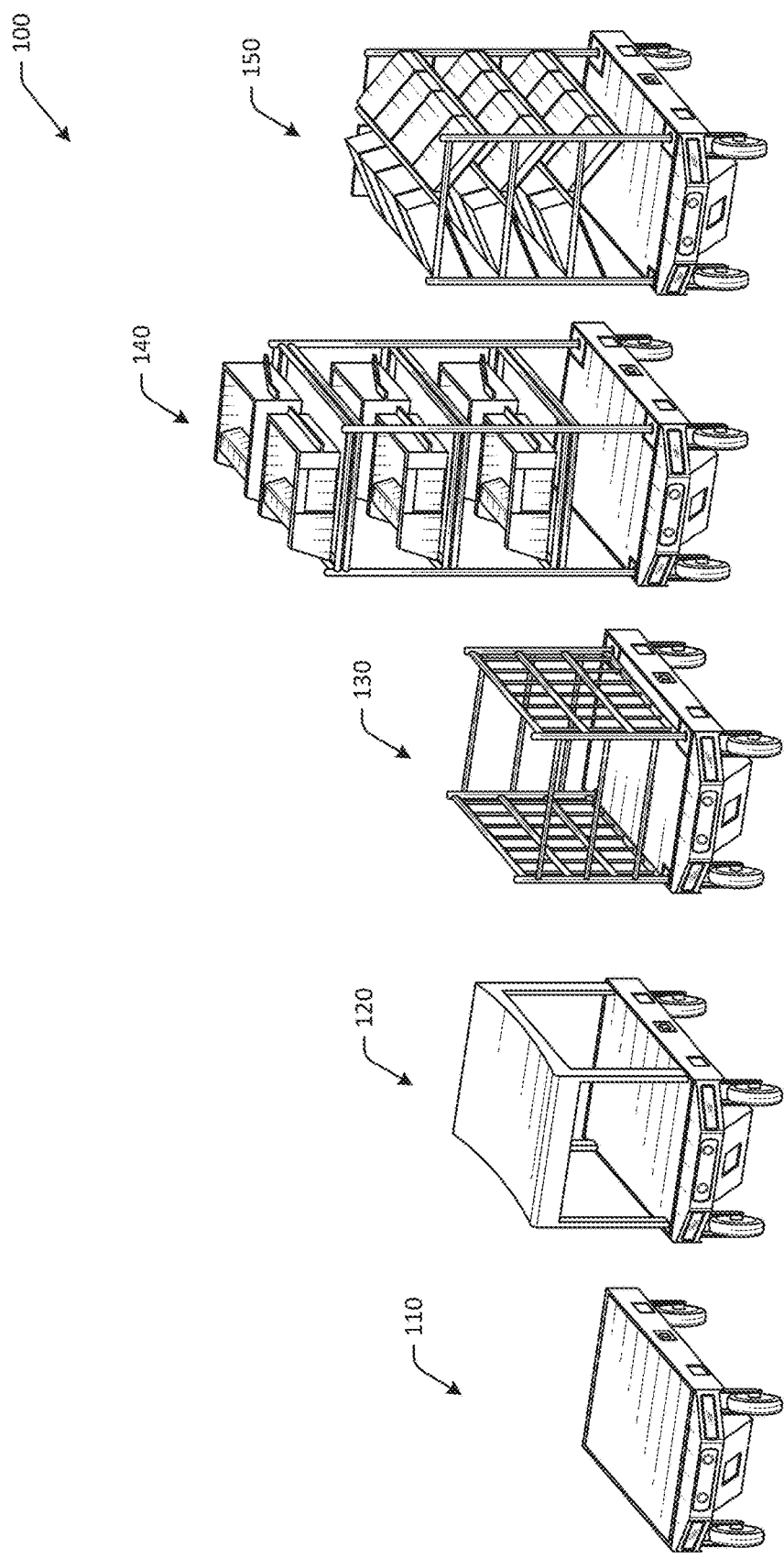
FIG. 1 is a schematic illustration of example use cases for mobile robots in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Robots may be used in various facilities, such as fulfillment centers and other facilities. Certain robots may be autonomous or semi-autonomous. For example, some robots may be configured to automatically move from a first location to a second location (e.g., indoor, outdoor, etc.) without manual operation or direction. Some robots may be fitted with attachments or other components depending on desired functionality. For example, a mobile robot may be equipped with a cart, container, shelving, or other components that may be used to transport items or products. In a particular example, a mobile robot may have a flat surface on which one or more shelves may be mounted. Items may be placed on the shelves, and the mobile robot may autonomously deliver the items, or move the items, from one location to another. In another example, a container or sidewalls may be mounted on the mobile robot, and certain items, such as round balls or other difficult to secure items may be transported by the mobile robot. As a result, the mobile robots may assist in the transport of equipment (e.g., robotic arms, cranes, lighting indicators, etc.) and/or items, thereby reducing manual effort and increasing efficiency and safety.

To perform different functions, different types of attachments or configurations may be used with mobile robots. For example, different types of supports may be used for different types of shelving and/or sidewalls for containers that may be coupled to a mobile robot. Examples of different supports include circular supports, rectangular supports, and so forth, as well as supports of different dimensions (e.g., different widths, different diameters, etc.). The different types and/or dimensions of supports and other attachments may need different mechanisms to be attached to the mobile robot. For example, different thread types, different hole locations, and so forth. Accordingly, removal and/or placement of supports and/or other attachments or components to mobile robots may be time consuming because specific mechanisms or plates may need to be used for different types of attachments or components.

In addition, some robots may be autonomous or semi-autonomous, and may be configured to automatically move or transit from a first location to a second location. For example, a user may input a destination for a mobile robot using a user interface at a device. The mobile robot may receive or otherwise determine the destination and navigate from its current location to the destination. Some robots may autonomously determine a route to reach from a current location to the destination. For example, in fulfillment center locations, a mobile robot may autonomously move from a packing station to a loading dock or other destination. However, more than one path to the destination may exist. For example, the mobile robot may move along various aisles or other paths to reach the destination. In some instances, such flexibility in determining a path may be referred to as freeform path determination.

Embodiments of the disclosure include systems and methods for determining preferred pathways for mobile robots. For example, certain embodiments may use various cost functions to influence the path selected by a mobile robot to reach a destination. Some paths may be preferred paths. Preferred paths may be designated by users, determined based at least in part on a lowest number of obstacles, determined based at least in part on current or expected traffic, and/or other factors. Accordingly, embodiments of the disclosure may be used by mobile robots to determine an optimal path to a destination with respect to one or more preferred paths, and/or may be used by a remote server to send directions or instructions to a mobile robot during transit.

Referring to FIG. 1, example use cases 100 for systems and methods to implement preferred pathways in mobile robots are depicted in accordance with one or more embodiments of the disclosure. Although discussed in the context of certain examples of autonomous cart functionality, other embodiments may be directed to any suitable use case where items may be transported.

FIG. 1 illustrates example mobile robot configurations with different types of supports and/or attachments. For example, a first mobile robot 110 may be a mobile robot with a flat upper surface on which various items can be positioned for transport. A second mobile robot 120 may be a mobile robot with four rectangular vertical supports and a table top surface coupled to the supports, so as to form a cart configuration. A third mobile robot 130 may be a mobile robot with four circular vertical supports and sidewalls coupled to the supports, so as to form a container configuration. A fourth mobile robot 140 may be a mobile robot with four circular vertical supports and flat shelving coupled to various points along the supports, thereby forming a first shelving configuration. A fifth mobile robot 150 may be a mobile robot with four circular vertical supports and angled shelving coupled to various points along the supports, thereby forming a second shelving configuration. Other configurations of the mobile robot may be included, along with different attachment types.

The various examples illustrated in FIG. 1 may be used to autonomously transport items from a first location to a second location. In some instances, a user may not have to input a path that the mobile robot is to follow, and the mobile robot may autonomously determine a path to follow to reach the destination. Certain embodiments may include functions that influence decisions made by the mobile robot when determining a path. For example, if a pre-designated preferred path includes an unforeseen obstacle, the mobile robot may use the function(s) to determine an audible, or may otherwise temporarily or permanently deviate from the preferred path without user input. As a result, functionality of the mobile robot may be improved and efficiency may be increased.

Example embodiments of the disclosure provide a number of technical features or technical effects. For example, in accordance with example embodiments of the disclosure, certain embodiments of the disclosure may automatically determine optimal paths to a destination using functions that result in implementation of soft guidelines for robot motion. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
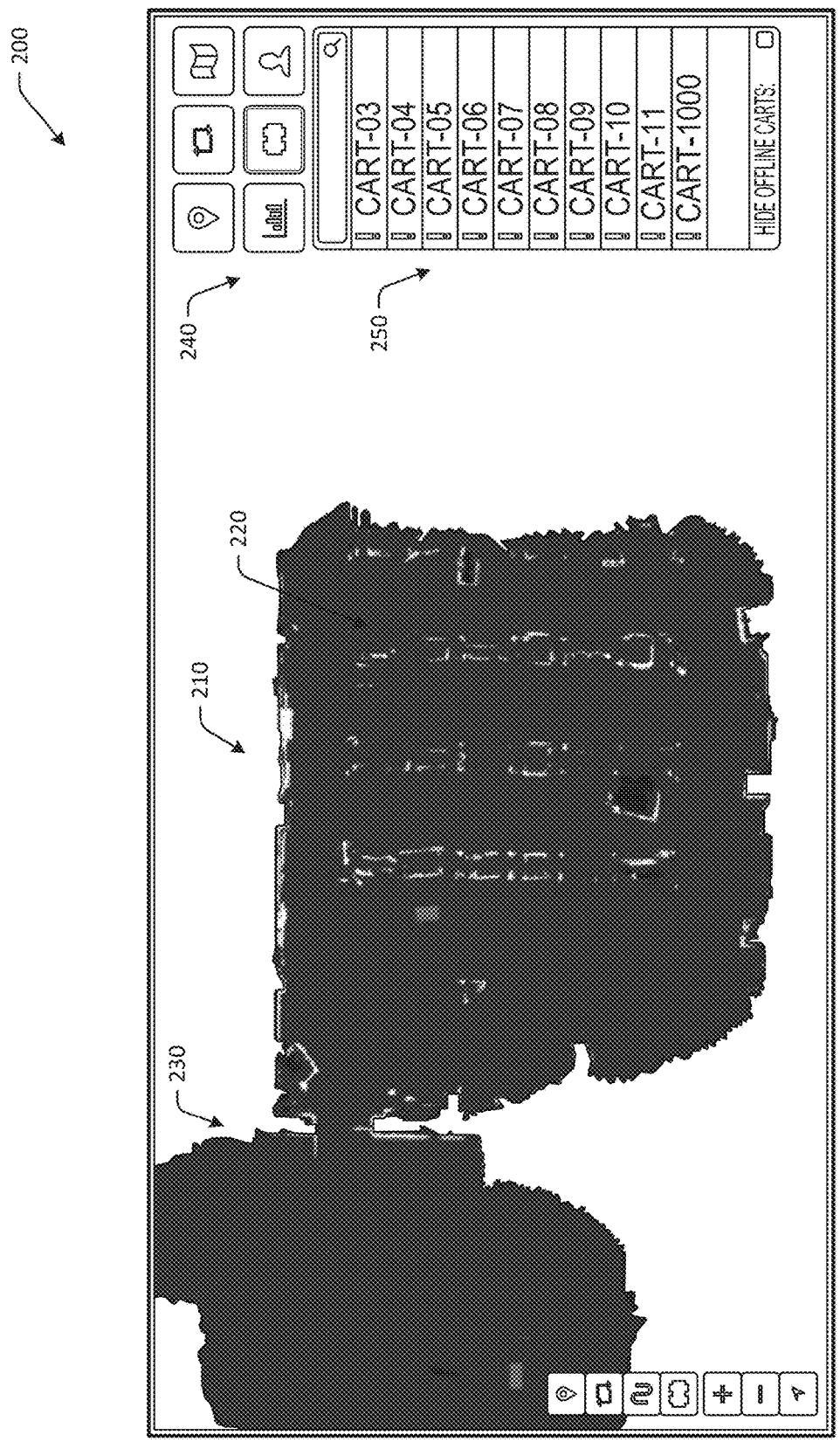
FIG. 2 is a schematic illustration of an example user interface for preferred pathways in accordance with one or more embodiments of the disclosure.

FIG. 2 is a schematic illustration of an example user interface 200 for preferred pathways in accordance with one or more embodiments of the disclosure. Other embodiments may include additional, fewer, or different user interface components. The user interface 200 may be generated by one or more remote servers and/or by a mobile robot, and may be presented at any suitable display, such as a display in wireless communication with the remote server and/or the mobile robot, a display coupled to the mobile robot, and so forth.

Certain embodiments may include preferred pathways functionality for mobile robots. Preferred pathways functionality may provide the ability for users to bias motion planning decisions that may be made in or near real-time by mobile robots. As a result, mobile robot behavior may be relatively more predictable. For example, preferred pathways functionality may be used to bias a mobile robot's motion along an aisle to be along one side of the aisle or the other. In another example, preferred pathways functionality may be used to implement one-way streets along narrow aisles, and/or to implement two-way streets along an aisle with motion in one direction along one side of the aisle and opposite motion along the other side (e.g., similar to a virtual road with a divider in the middle of the aisle, etc.). Another example may include biasing mobile robot motion to stay out of areas with traffic (e.g., heavy foot/forklift traffic, etc.) by preferring to navigate through other areas that may have less traffic. In some embodiments, such pathways may be designated preferred pathways in a user interface.

In some embodiments, preferred pathways may be used as hints for motion planning, but may not be hard rules. For example, if a preferred pathway is not traversable (due to an obstacle for example) then a mobile robot may attempt to find an alternate route to the destination when planning, factoring in other potential preferred pathways in the process. Similarly, mobile robots may not necessarily traverse the entire length of a preferred pathway segment. Rather, mobile robots may "latch on" to a segment when it is feasible to do so, and deviate as necessary (e.g., to avoid a forklift in motion, etc.).

Preferred pathway functionality may be implemented by mobile robots as robots move from toward a destination and assess traversability along a preferred path. Preferred pathway functionality may introduce bias to a certain path and/or away from other alternatives, thereby increasing predictability of mobile robot motion behavior. Bias may be for staying on a certain side of a pathway, avoiding certain areas, and so forth.

FIG. 2 illustrates the example user interface 200 for configuring preferred pathways. In FIG. 2, a map 210 generated by one or more mobile robots is depicted in the user interface 200. The map 210 may illustrate obstacles and/or other objects identified by one or more mobile robots in a system during previous movements. Accordingly, the map 210 may not be an exact mapping of an environment, but rather may include components actually detected by mobile robots in the system. For example, the map 210 may include a set of racks 220 that were identified during previous robot motion, along with a dark area 230 that has not yet been mapped by mobile robots. A set of options 240 may be used by a user to implement various tasks, and a set of mobile robots 250 in the system may be included in the user interface 200. The set of mobile robots 250 may include online and/or offline mobile robots.

Figure 3:
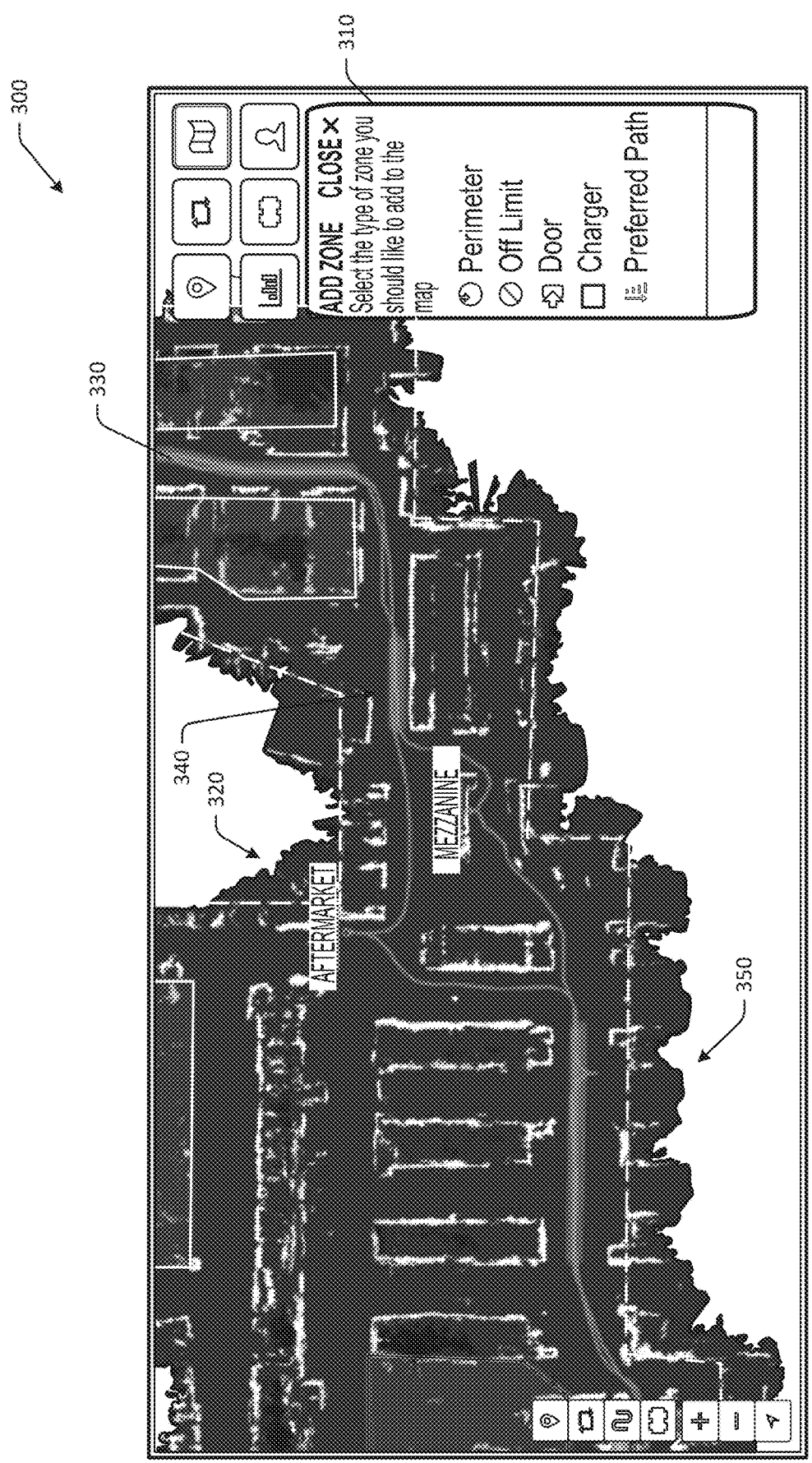
FIG. 3 is a schematic illustration of an example user interface for preferred pathways in accordance with one or more embodiments of the disclosure.
Figure 4:
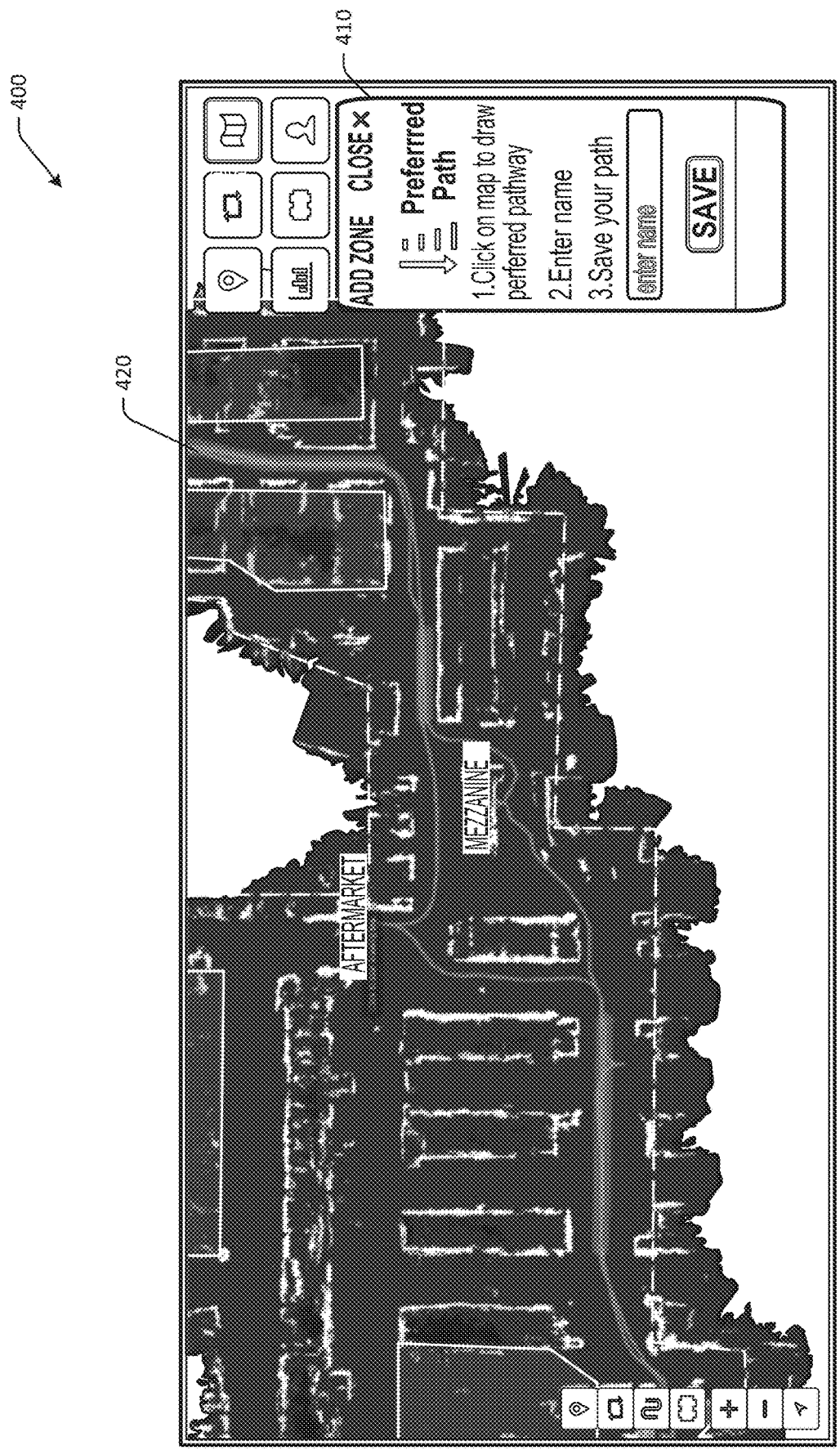
FIG. 4 is a schematic illustration of an example user interface for preferred pathways in accordance with one or more embodiments of the disclosure.

Referring to FIGS. 3 and 4, FIG. 3 is a schematic illustration of an example user interface 300 for preferred pathways in accordance with one or more embodiments of the disclosure. Other embodiments may include additional, fewer, or different user interface components. The user interface 300 may be generated by one or more remote servers and/or by a mobile robot, and may be presented at any suitable display, such as a display in wireless communication with the remote server and/or the mobile robot, a display coupled to the mobile robot, and so forth.

In FIG. 3, the user interface 300 may be used to add or configure one or more preferred pathways. The user may select "zones" from a menu at the user interface 300, which may result in the appearance of a submenu 310. The user may select a type of zone that the user would like to add to a map 320. For example, the user may add a perimeter or off limit zone that limits mobile robot motion, a door, a charger location, a preferred path, and/or other zones. Previously added preferred pathways 330 may be depicted with thicker bold lines or other graphical elements, and can be curved or straight segments, such as straight segments 340, 350. The path between a first straight segment 340 and a second straight segment 350 may be ad-hoc or freeform. The user may select the preferred pathway zone option.

After selecting the preferred pathway zone option, a fourth user interface 400 may be presented. FIG. 4 is a schematic illustration of an example user interface 400 for preferred pathways in accordance with one or more embodiments of the disclosure. Other embodiments may include additional, fewer, or different user interface components. The user interface 400 may be generated by one or more remote servers and/or by a mobile robot, and may be presented at any suitable display, such as a display in wireless communication with the remote server and/or the mobile robot, a display coupled to the mobile robot, and so forth. In FIG. 4, a preferred pathway submenu 410 may appear, along with previous preferred pathways, such as preferred pathway 420.

Figure 5:
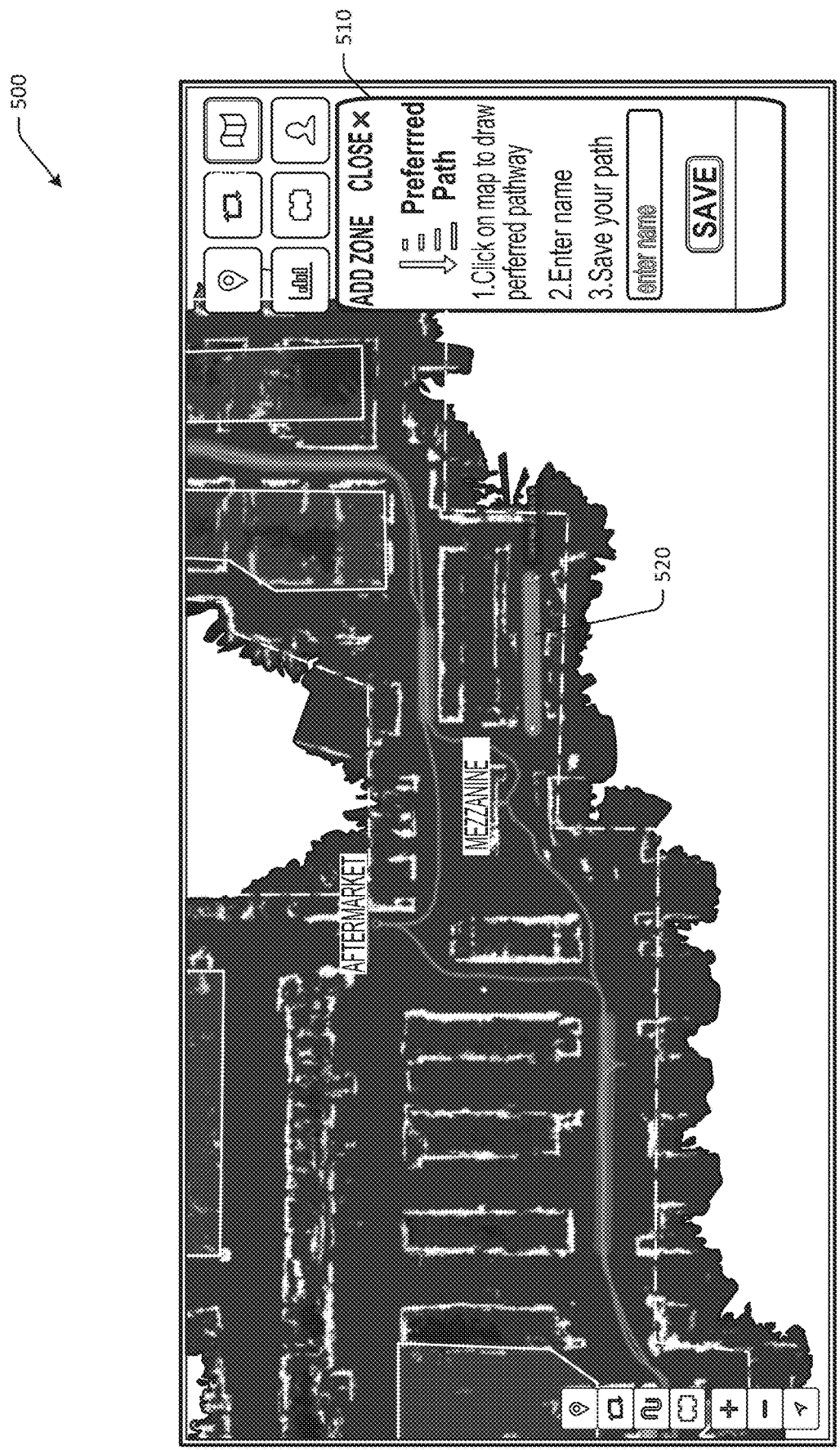
FIG. 5 is a schematic illustration of an example user interface for preferred pathways in accordance with one or more embodiments of the disclosure.

FIG. 5 is a schematic illustration of an example user interface 500 for preferred pathways in accordance with one or more embodiments of the disclosure. Other embodiments may include additional, fewer, or different user interface components. The user interface 500 may be generated by one or more remote servers and/or by a mobile robot, and may be presented at any suitable display, such as a display in wireless communication with the remote server and/or the mobile robot, a display coupled to the mobile robot, and so forth.

In FIG. 5, the user may manually input straight or curved line segments representing a new preferred pathway, and/or may modify existing preferred pathways. For example, the user may draw a preferred path 520 as a series of connected line segments in the user interface 520. When completed, the user may select a save option in a preferred pathway submenu 510.

Figure 6:
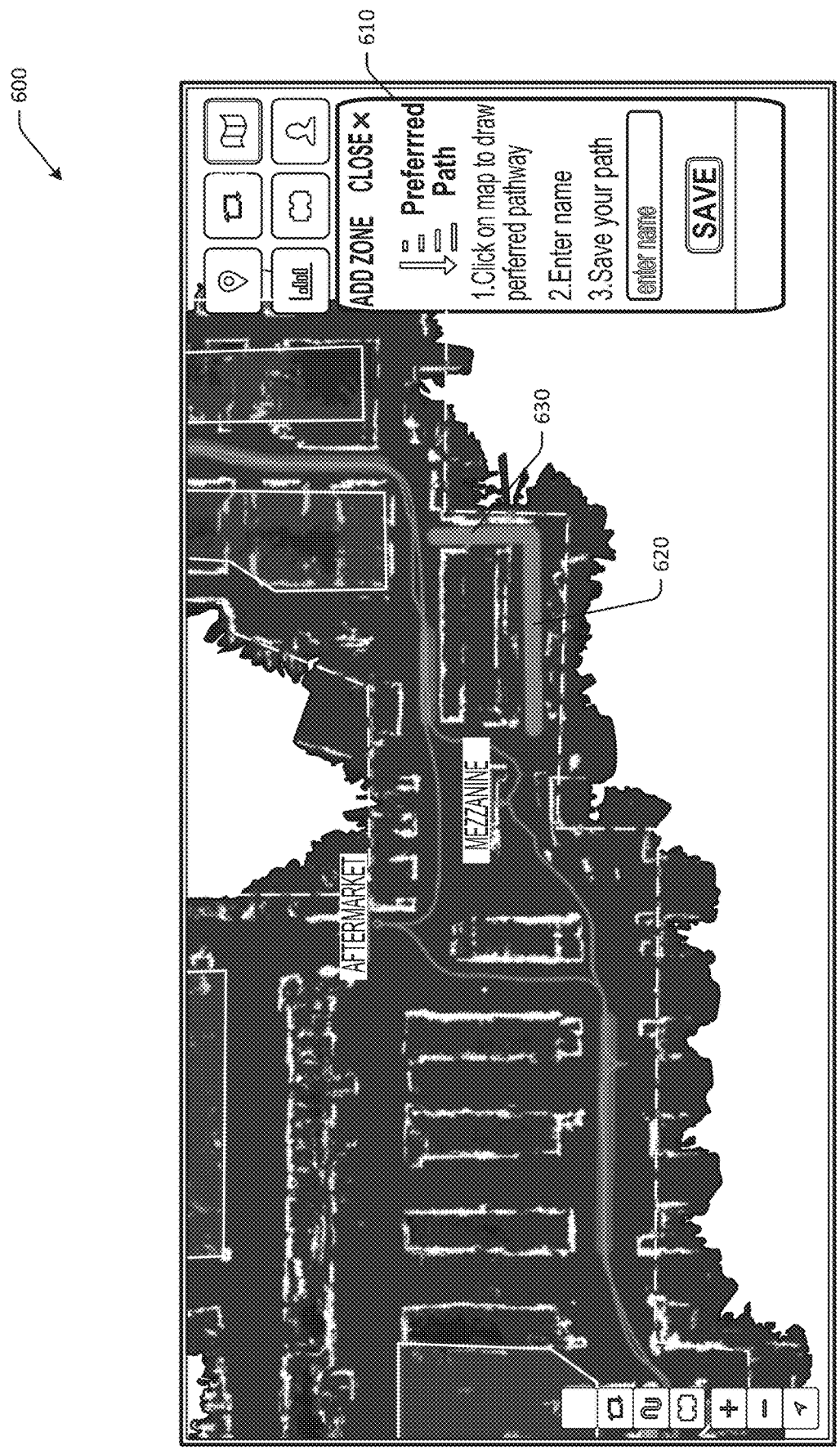
FIG. 6 is a schematic illustration of an example user interface for preferred pathways in accordance with one or more embodiments of the disclosure.
Figure 7:
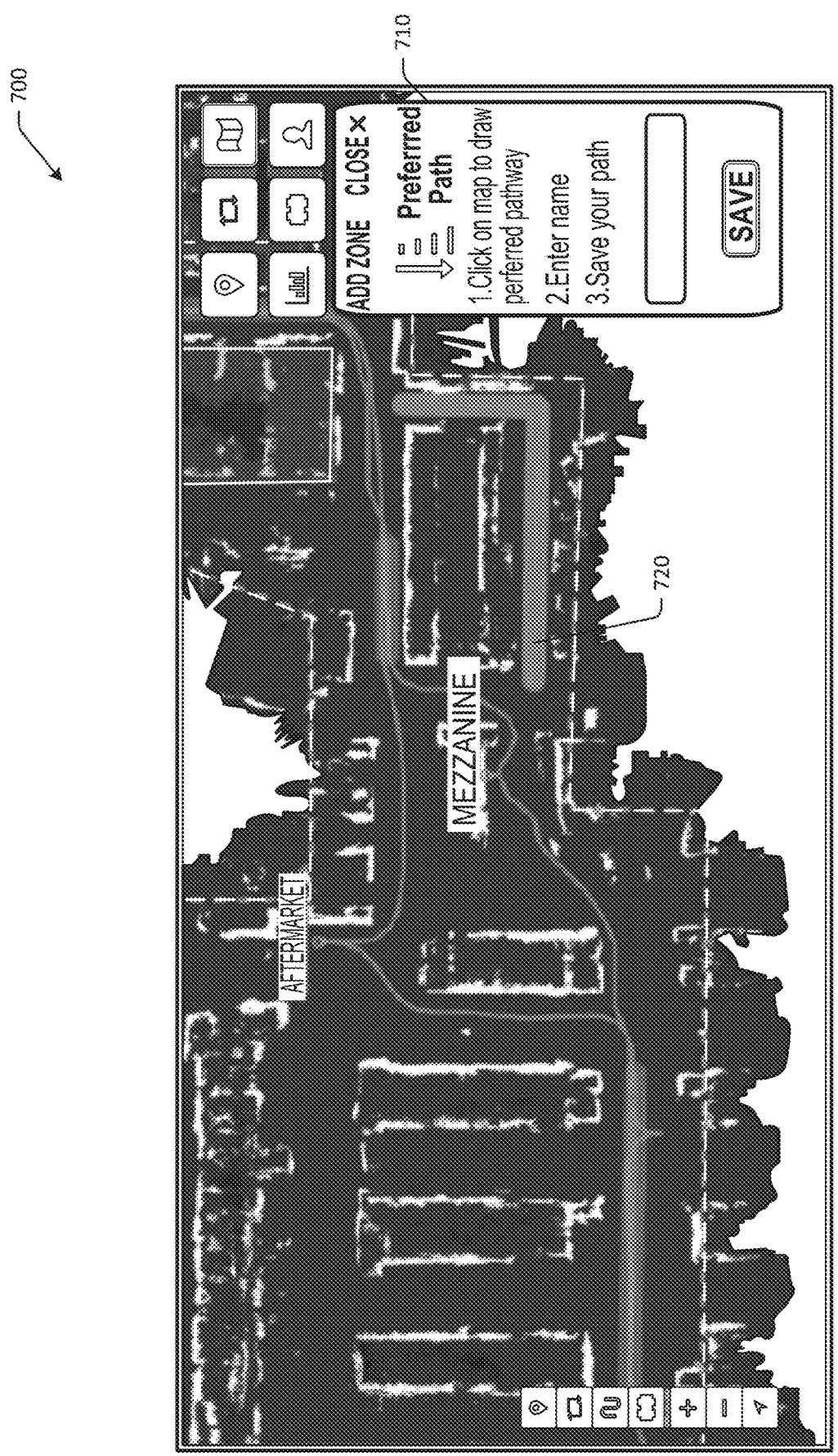
FIG. 7 is a schematic illustration of an example user interface for preferred pathways in accordance with one or more embodiments of the disclosure.
Figure 8:
FIG. 8 is a schematic illustration of an example user interface for preferred pathways in accordance with one or more embodiments of the disclosure.

Referring to FIGS. 6-8, FIG. 6 is a schematic illustration of an example user interface 600 for preferred pathways in accordance with one or more embodiments of the disclosure. Other embodiments may include additional, fewer, or different user interface components. The user interface 600 may be generated by one or more remote servers and/or by a mobile robot, and may be presented at any suitable display, such as a display in wireless communication with the remote server and/or the mobile robot, a display coupled to the mobile robot, and so forth.

In FIG. 6, the user may continue adding preferred pathways, such as preferred pathway 630 connected to preferred pathway 620 to form an "L" shaped preferred pathway. The user may add a name and/or save the newly added preferred pathways using a save option at a preferred pathway submenu 610. The preferred pathways 620, 630 may be unidirectional or bidirectional. The user may designate a certain side of the respective preferred pathways 620, 630 for preferred travel in a certain direction. In a motion planning domain for mobile robots, the line segments of preferred pathways 620, 630 and previously entered preferred pathways may be considered a field. Mobile robots may use one or more cost functions to assess a cost of complying with the respective fields or preferred pathways.

In FIG. 7, a newly added segment 720 (which may be the same segment as that illustrated in FIG. 6 as preferred pathway 620) may be saved. FIG. 7 is a schematic illustration of an example user interface 700 for preferred pathways in accordance with one or more embodiments of the disclosure. Other embodiments may include additional, fewer, or different user interface components. The user interface 700 may be generated by one or more remote servers and/or by a mobile robot, and may be presented at any suitable display, such as a display in wireless communication with the remote server and/or the mobile robot, a display coupled to the mobile robot, and so forth.

Using the user interface 700, a user may configure a strength of the newly added preferred pathway 700. Strength may be indicated as a priority level of following the preferred pathway 720, and/or reflected by one or more cost functions implemented by a mobile robot.

FIG. 8 is a schematic illustration of an example user interface 800 for preferred pathways in accordance with one or more embodiments of the disclosure. Other embodiments may include additional, fewer, or different user interface components. The user interface 800 may be generated by one or more remote servers and/or by a mobile robot, and may be presented at any suitable display, such as a display in wireless communication with the remote server and/or the mobile robot, a display coupled to the mobile robot, and so forth.

In FIG. 8, the user interface 800 may reflect the saved preferred pathways, which may then be used by mobile robots to navigate the environment. Accordingly, users may define a preferred pathway via connected segments, where each segment is a straight or curved line. Other preferred pathways may be defined as areas having certain geometries, regions, and the like. In other embodiments, preferred pathways may be input via websites, programmatic application programming interfaces (API), digital files, automatically determined by algorithms (e.g., edge detection algorithms, perimeter detection algorithms, etc.), and so forth. Once a path is defined, mobile robots moving through, or planning movements through, the environment surrounding the segments will prefer to travel along the segments, if possible. Optionally, preferred paths can be turned on or off, depending on the particular task the mobile robot may be undertaking (e.g., this could be configured as a function of the route, the time of day, etc.). Any number of preferred pathways may be used.

Certain preferred pathways may be unidirectional (e.g., traffic should be allowed to flow in only one direction along the path), or bidirectional. For unidirectional preferred pathways, mobile robots will only prefer to travel along the pathways, if they are traveling in the same direction as the pathway's given direction.

Figure 9:
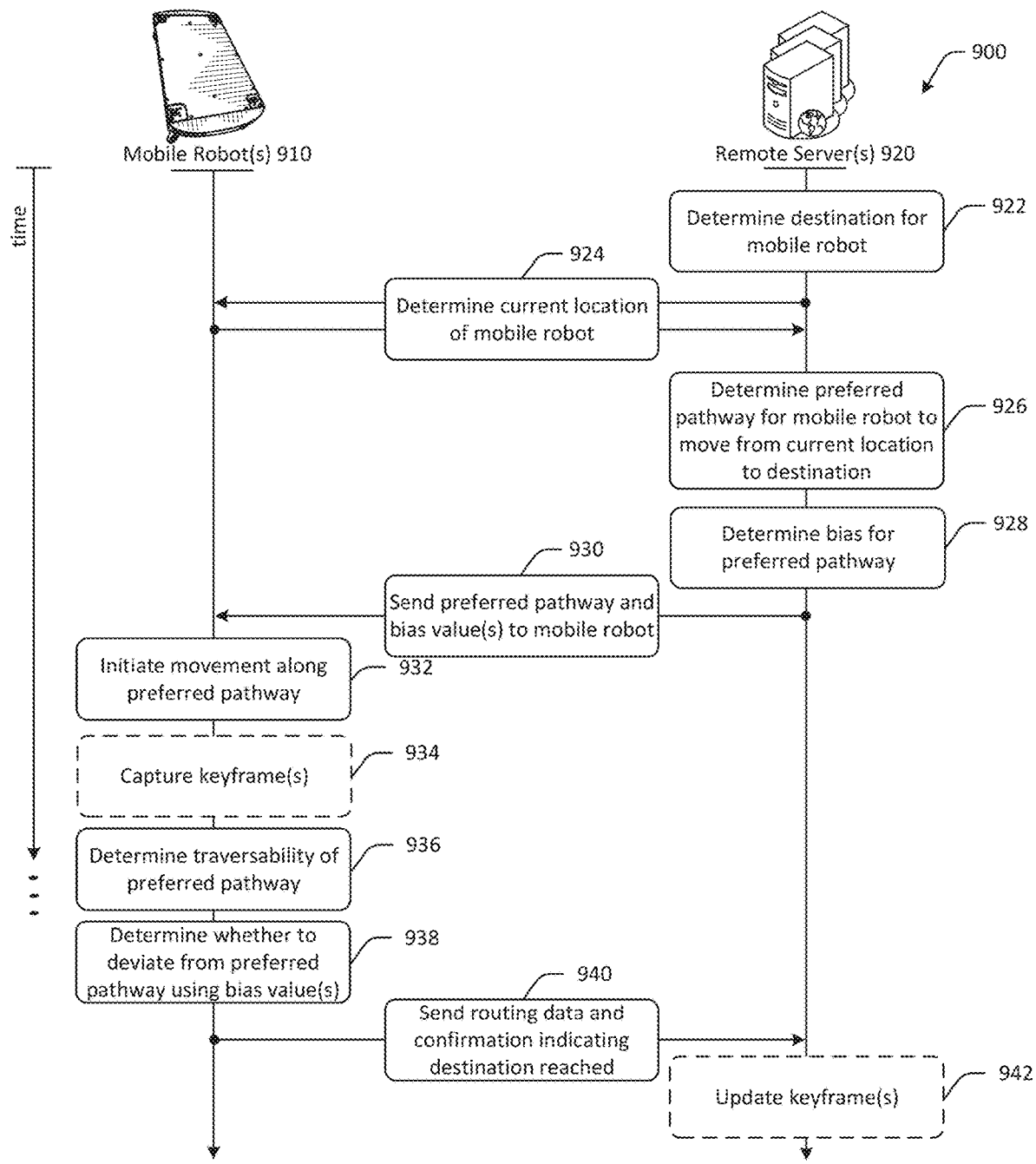
FIG. 9 is a schematic illustration of an example data flow over time for implementation of preferred pathways at a mobile robot in accordance with one or more embodiments of the disclosure.

FIG. 9 is a schematic illustration of an example data flow 900 over time for implementation of preferred pathways at a mobile robot in accordance with one or more example embodiments of the disclosure. A preferred pathway system may include one or more mobile robots 910, and/or one or more remote servers 920. Each of the system components may be in communication via one or more networks.

On each occasion that the preferred pathways are updated, the updated path definitions may propagated to the remote server 920, and/or onto all of the mobile robots 910 connected directly or indirectly to the remote server 920. The pathways can be disseminated to the mobile robots 910 in a number of different ways over wired or wireless communication.

During motion planning, a mobile robot 910 may evaluate the preferred pathways and bias its motion planning to include the hints provided by the preferred pathways. Preferred pathways may be factored into some or all stages of motion planning (e.g., global planning, local planning, plan smoothing, etc.).

Planned pathways may be temporary commitments by mobile robots 910. For example, a mobile robot 910 may follow a first preferred pathway and then deviate and return to the first preferred pathway (e.g., due to an obstacle, etc.). In another example, a mobile robot 910 may move from a first preferred pathway to a second preferred pathway.

Referring to the dataflow 900 presented in FIG. 9, at operation 922, the remote server 920 may determine a destination for a mobile robot 910. For example, a user may input a destination at a user interface associated with the remote server 920. In another example, the destination may be preset or may be determined by the mobile robot 910 automatically. At operation 924, the remote server 920 may determine a current location of the mobile robot 910. For example, the remote server 920 may request a location from the mobile robot 910, or may determine the location using a system location tracker. At operation 926, the remote server 920 may determine a preferred pathway for the mobile robot 910 to move from its current location to its destination. In some embodiments, the preferred pathway may be determined based at least in part on user input. At operation 928, the remote server 920 may determine a bias for one or more segments of the preferred pathway. For example, a user may input a strength or priority of maintaining travel along a certain segment or certain preferred pathway.

At operation 930, the remote server 920 may send the preferred pathway and bias value(s) to the mobile robot. For example, different segments of a preferred pathway, or different preferred pathways, may have different strengths or bias values. The mobile robot 910 may receive the preferred pathway data and bias values data.

At operation 932, the mobile robot 910 may initiate movement along the preferred pathway. For example, the mobile robot 910 may determine its destination and autonomously begin moving toward the destination, and may move along the preferred pathway. At optional operation 934, the mobile robot 910 may capture one or more key frames. Key frames may be used to generate environment maps, such as that illustrated in FIG. 2. Key frames may be regularly captured and used to update environment maps. In some instances, when preferred pathways are input, nearby key frames that were previously captured may be associated with the preferred pathway (e.g., an anchor point associated with the preferred pathway, etc.). The preferred pathway may be associated with nearby key frames if exact location key frames are unavailable.

At operation 936, the mobile robot 910 may determine traversability of the preferred pathway. For example, as the mobile robot 910 moves, the mobile robot 910 may determine traversability using one or more sensors, such as cameras, proximity sensors, radar, LIDAR, and/or other sensors. The mobile robot 910 may determine whether the preferred pathway can be traversed and/or if an obstacle is present. At operation 938, the mobile robot 910 may determine whether to deviate from the preferred pathway using the bias values. For example, the mobile robot 910 may autonomously make decisions regarding whether to move along a certain path using bias values. For example, the mobile robot 910 may determine whether to pause along a preferred pathway, deviate around an obstacle and return to the preferred pathway, move to a different pathway, and so forth. Bias values to determine mobile robot action may be included as part of a cost function. Cost functions may be a function of one or more of distance of deviation, affinity of cost measurement, length of time of deviation, alignment with a preferred path, and/or other functions or factors. In some instances, the process flow 900 may return to operation 924 from operation 936. For example, the mobile robot 910 may request results of global planning output from the remote server in instances where the mobile robot 910 is unable to determine a workaround or path deviation locally.

At operation 940, the mobile robot 910 may send routing data and confirmation indicating it reached its destination to the remote server 920. The routing data may include data related to the route the mobile robot 910 took, any deviations made by the mobile robot 910, key frames captured by the mobile robot 910, and/or other data. At optional operation 942, the remote server may update the key frame data associated with an environment using the key frames captured by the mobile robot 920, which can then be used by other robots for motion planning and/or execution.

Figure 10:
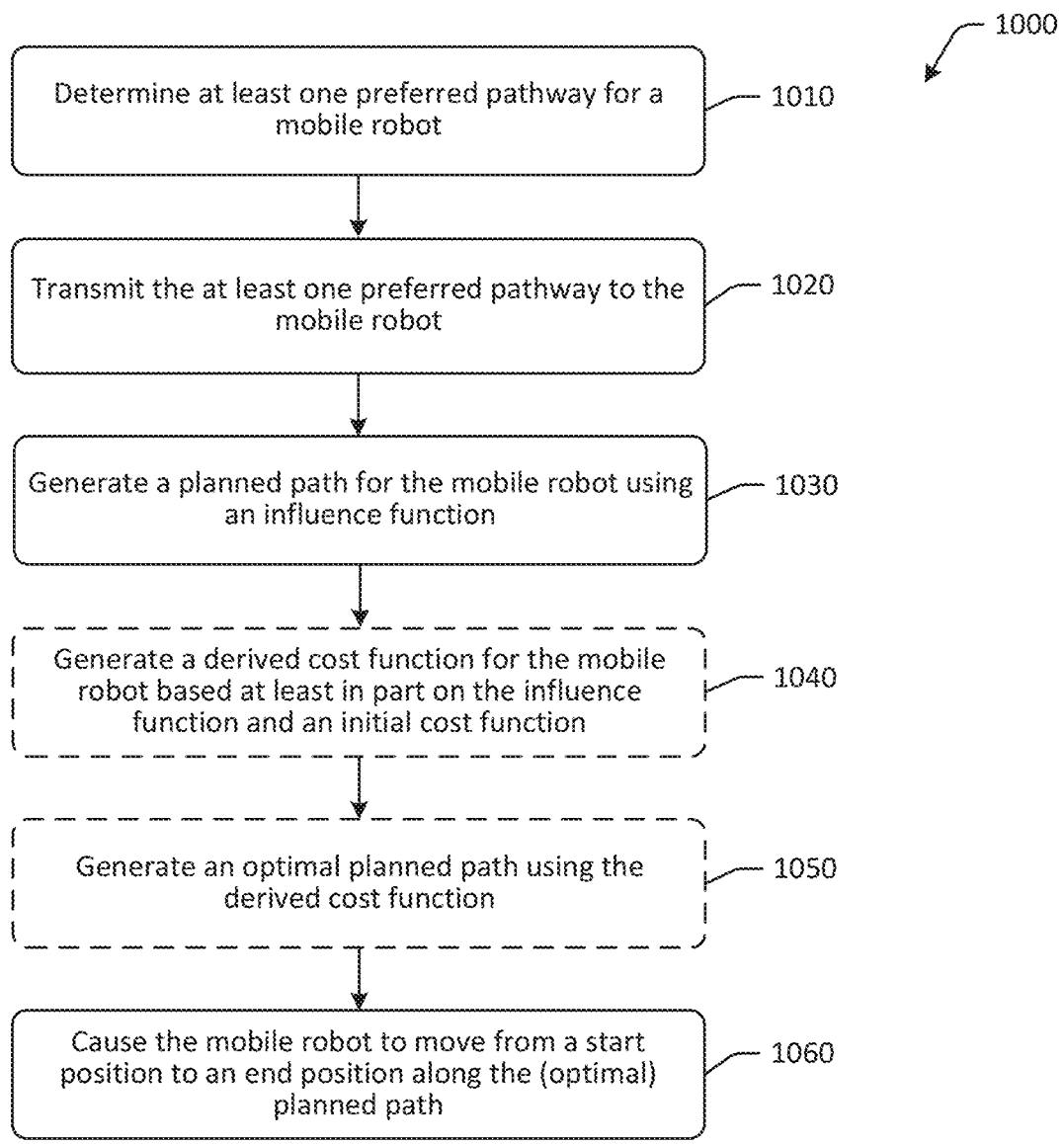
FIG. 10 is a schematic illustration of an example process flow for implementation of preferred pathways at a mobile robot in accordance with one or more embodiments of the disclosure.

FIG. 10 depicts an example process flow 1000 for implementation of preferred pathways at a mobile robot in accordance with one or more example embodiments of the disclosure. While example embodiments of the disclosure may be described in the context of preferred pathways, it should be appreciated that the disclosure is more broadly applicable to autonomous robot motion planning. Some or all of the blocks of the process flows in this disclosure may be performed in a distributed manner across any number of devices. The operations of the process flow 1000 may be performed in a different order.

At block 1010, at least one preferred pathway may be determined for a mobile robot. For example, computer-executable instructions stored on a memory of a device, such as a server, may be executed to determine at least one preferred pathway for a mobile robot. The preferred pathway may be input at a user interface by a user. In some embodiments, preferred pathway data may be automatically pushed to mobile robots in a system when input by a user.

In another example, the remote server or mobile robot may obtain, via at least one of a user interface and an optional corresponding Application Programming Interface (API) call, at least one preferred pathway for an autonomous mobile robot. In some embodiments, the preferred pathway may include a series of connected segments on a visual representation of an environment, the series of connected segments being input by a user via a user interface. The at least one preferred pathway may include a concatenation of the series of the connected segments At block 1020, the at least one preferred pathway may be transmitted to the mobile robot. For example, computer-executable instructions stored on a memory of a device, such as a server, may be executed to transmit the at least one preferred pathway to the mobile robot. In some embodiments, preferred pathway data may be automatically pushed to mobile robots in a system when input by a user. The mobile robots may use the preferred pathway data when planning and/or implementing motion.

At block 1030, a planned path for the mobile robot may be generated using an influence function. For example, computer-executable instructions stored on a memory of a device, such as a server or a mobile robot, may be executed to generate a planned path for the mobile robot using one or more influence functions. In some embodiments, the mobile robot may generate the planned path independently after receiving a destination input. Accordingly, the mobile robot may autonomously generate the planned path. The planned path may be a path that the mobile robot intends to follow unless unknown or unforeseen obstacles are detected.

In some embodiments, the planned path may be generated based at least in part on an influence function, the influence function being representative of an amount of bias towards the at least one preferred pathway on a motion planning decision of the autonomous mobile robot. The amount of bias may be based at least in part on a metric associated with the at least one preferred pathway, such as a distance of the autonomous mobile robot to the at least one preferred pathway. The initial cost function may be configured to reduce a cost of travel for the autonomous mobile robot from the start point to the end point, where the cost of travel may be distance and/or time. If the preferred pathway is bidirectional, the influence function may not be affected by relative orientation of movement of the autonomous mobile robot with respect to the at least one preferred pathway. If the preferred pathway is unidirectional, the influence function may not be affected by relative orientation of movement of the autonomous mobile robot with respect to the at least one preferred pathway.

In some embodiments, mobile robots may determine planned paths. For example, mobile robots may plan motion by generating a plan to move from a start location to a goal or end location, while avoiding known obstacles in the environment between the start and the goal. Since there could be many routes connecting the start point to the goal, the objective may be to find the "optimal" feasible route between them. This may be implemented as an optimization to minimize a cost function (e.g., find the path to minimize):

$$PathCost(s) = \int_{start}^{goal} Cost(x)ds$$

Depending on how the cost function is defined, the optimal path will follow. For example, if the cost function is defined as a constant value (e.g. one unit of cost per meter traveled), the optimal (e.g., lowest cost) plan would be the shortest path. If the cost function is defined to be 0 everywhere, but a cost of 1 is incurred every time the mobile robot makes a turn, the mobile robot would find the path with the fewest turns.

The cost function for preferred pathways may be defined as a non-uniform cost function, where the cost function at a given point on the ground-plane is a function of the proximity to each preferred pathway. The closer the point is to the preferred pathway, the stronger the effect. For preferred pathways that are bidirectional, the cost may be accrued at a lower rate than normal (e.g., less than 1 unit cost per meter, becoming lower as the proximity to the preferred pathway increases). For preferred pathways that are unidirectional, the cost may be accrued at a lower rate than normal if the motion is aligned with the direction of the path, and a higher cost than normal if the motion is contrary to the direction of the path. The effect may remain relatively stronger the closer the motion is to the preferred pathway. In some embodiments, in addition to, or instead of, the cost function, an inverse of the cost function may be used to determine penalty values for deviation from the preferred pathway. Penalties may be determined locally at mobile robots or at a remote server.

At optional block 1040, a derived cost function for the mobile robot may be generated based at least in part on the influence function and an initial cost function. For example, computer-executable instructions stored on a memory of a device, such as a server or a mobile robot, may be executed to generate a derived cost function for the mobile robot based at least in part on the influence function and an initial cost function. The derived cost function may be used to generate an optimal planned path. The derived cost function may be configured to modify the cost of travel by accounting for the amount of bias toward the preferred pathway, and may include effects of the influence function. The derived cost function may reduce the cost of travel as the distance of the autonomous mobile robot from the at least one preferred pathway decreases.

In some embodiments, in response to the motion of the autonomous mobile robot being aligned in a direction of the at least one preferred pathway, generating a function to reduce the cost of travel as the distance of the autonomous mobile robot from the at least one preferred pathway decreases, thereby biasing the autonomous mobile robot towards the at least one preferred pathway. In response to the motion of the autonomous mobile robot being in an opposite direction to the at least one preferred pathway, generating a function to increase the cost of travel as the distance of the autonomous mobile robot from the at least one preferred pathway decreases, thereby biasing the autonomous mobile robot away from the at least one preferred pathway.

At optional block 1050, an optimal planned path may be generated using the derived cost function. For example, computer-executable instructions stored on a memory of a device, such as a server or a mobile robot, may be executed to generate an optimal planned path using the derived cost function. The optimal planned path may result in the lowest cost path to reach the destination.

At block 1060, the mobile robot may be caused to move from a start position to an end position along the (optionally optimal) planned path. For example, computer-executable instructions stored on a memory of a device, such as a server or a mobile robot, may be executed to move, or cause to move, the mobile robot from the start position to the end position along the planned path. Movement may be implemented in a manner that limits the cost function to its lowest value.

In some embodiments, causing the autonomous mobile robot to move may include causing the mobile robot to move from the start point to the end point in a first direction along the planned path, and/or causing the autonomous mobile robot to move from the start point to the end point in a second direction along the planned path.

The following bidirectional preferred path equations may be implemented or used in one or more embodiments:

The following equation may define the minimum distance of a point to a given preferred path: $D_{path}(x):R^2 \rightarrow R \geq 0$ An influence function may be defined as $I(x):R \geq 0 \rightarrow [0,1]$, as a continuous monotonically decreasing function with $I(0)=1$. This function may represent the influence of a preferred path at a distance from the preferred path.

A Cost-Discount for a Preferred Path may be defined as $C_{path}:[0,1]$ This may be the amount by which the cost-to travel is reduced at a distance of 0 from the Preferred Path's line segments. The Preferred Path implementation then defines the cost to travel at a point as:

$$\text{Cost}(x) = 1 - \left( \sum_{paths} I^2(D\text{path}(x)) \cdot C\text{path} \right) / \left( \sum_{paths} I(D\text{path}(x)) \right)$$

Certain parameters which can be tuned to influence the behavior of preferred paths may include the function $I(x)$, which can be tuned to affect the area of influence of each preferred path. Certain implementations may have $I(x)=0$ for all x greater than some threshold distance. By reducing the threshold distance the planner optimization will be more strongly encouraged to generate paths toward the center of the preferred path. The x value may optionally include the orientation of the vehicle as well.

Preferred paths that are at a distance greater than this threshold distance from the point x may be ignored in the Cost(x) calculation above, thus reducing computational complexity. The larger the Cost-Discount values $C_{path}$ the more likely for the planner optimization to travel along the preferred path. In minimizing the cost from the start to the goal (above) with the cost function (above), the motion planning optimization may find routes that track the preferred pathways where it is optimal to do so (and in the case that the preferred pathway is unidirectional, avoid routes that go contrary to the direction of the path). It may also provide optimal and realizable plans in the case that any of the Preferred Pathways are not traversable. This provides the predictable but flexible motion planning that may be desired by a user Illustrated Example The examples below are given to illustrate the concept of preferred paths. In these examples, the planning space is discretized into a grid (whereas the actual implementation of preferred paths provides a continuous cost function over the continuous planning space) with cost to travel on the preferred path at 0.5 (whereas all other squares have a cost of 1).

The first picture shows the optimal (e.g., lowest cost) path from the start to the goal with the robot traversing the Preferred Path for some of the route, where S is a Starting point, G is a Goal or destination, blank boxes indicate a blocked path, blocks with the number 1 or 0.5 indicate a preferred path, and a lowest cost path would be vertically up from S (0.5), diagonal upwards to the right (0.5), diagonal upwards to the right (0.5), diagonal downwards to the right (1), diagonal downwards to the right (1), and vertically downwards to G:

| 1 | 1 | 1 | 1 | .5 | 1 | 1 |
|---|---|---|---|---|---|---|
| 1 | 1 | 1 |  .5 | 1 | 1 | 1 |
| 1 | 1 | .5 | .5 | 1 | 1 | 1 |
| 1 | .5 | 1 |  | 1 | 1 | 1 |
| .5 | S | 1 |  | 1 | G | 1 |
| 1 | 1 | 1 |  | 1 | 1 | 1 |
| 1 | 1 | 1 |  | 1 | 1 | 1 |
| 1 | 1 | 1 | 1 | 1 | 1 | 1 |
| 1 | 1 | 1 | 1 | 1 | 1 | 1 |

In the above example, the optimal cost from the start to the goal is 3.5. If additional obstacles are inserted into the environment, as illustrated below, the optimal route from the start to the goal could change in such a way as to avoid the preferred path altogether, where S is a Starting point, G is a Goal or destination, blank boxes indicate a blocked path, white blocks indicate a preferred path, and a lowest cost path would be vertically down from S (1), diagonal downwards to the right (1), diagonal downwards to the right (1), diagonal upwards to the right (1), diagonal upwards to the right (1), and vertically upwards to G:

| 1 | 1 | 1 | 1 | .5 | 1 | 1 |
|---|---|---|---|---|---|---|
| 1 | 1 | 1 | .5 | 1 | 1 | 1 |
| 1 |  |  |  | 1 | 1 | 1 |
| 1 | .5 | 1 |  | 1 | 1 | 1 |
| .5 | S | 1 |  | 1 | G | 1 |
| 1 | 1 | 1 |  | 1 | 1 | 1 |
| 1 | 1 | 1 |  | 1 | 1 | 1 |
| 1 | 1 | 1 | 1 | 1 | 1 | 1 |
| 1 | 1 | 1 | 1 | 1 | 1 | 1 |

In this example, the optimal cost from the start to the goal is 5. Any attempt to traverse from the start to the goal via the preferred path would increase this cost, therefore the preferred path is not chosen in the optimization.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

illustrative COMPUTER ARCHITECTURE

Figure 11:
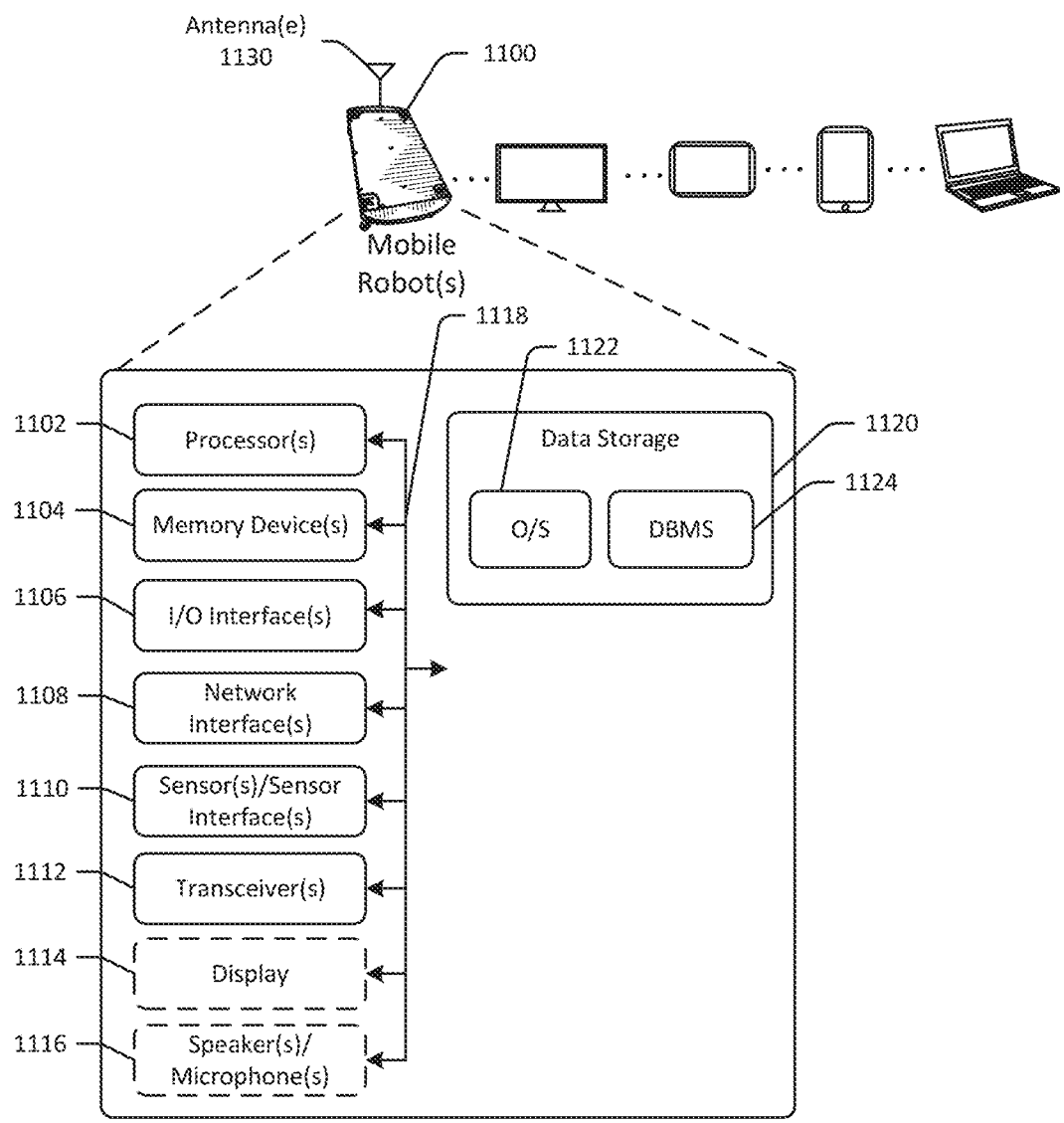
FIG. 11 schematically illustrates an example architecture of a mobile robot in accordance with one or more embodiments of the disclosure.

FIG. 11 is a schematic block diagram of one or more illustrative mobile robot(s) 1100 in accordance with one or more example embodiments of the disclosure. The mobile robot(s) 1100 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The mobile robot(s) 1100 may correspond to an illustrative device configuration for the device(s) of FIGS. 1-10.

The mobile robot(s) 1100 may be configured to communicate with one or more servers, user devices, or the like. The mobile robot(s) 1100 may be configured to move autonomously in some instances.

The mobile robot(s) 1100 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the mobile robot(s) 1100 may include one or more processors (processor(s)) 1102, one or more memory devices 1104 (also referred to herein as memory 1104), one or more input/output (I/O) interface(s) 1106, one or more network interface(s) 1108, one or more sensor(s) or sensor interface(s) 1110, one or more transceiver(s) 1112, one or more optional display(s) 1114, one or more optional microphone(s) 1116, and data storage 1120. The mobile robot(s) 1100 may further include one or more bus(es) 1118 that functionally couple various components of the mobile robot(s) 1100. The mobile robot(s) 1100 may further include one or more antenna(e) 1130 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1118 may include at least one of a system bus, a memory bus, an address bus, or a message bus, and may permit the exchange of information (e.g., data (including computer-executable code), signaling, etc.) between various components of the mobile robot(s) 1100. The bus(es) 1118 may include, without limitation, a memory bus or a memory controller, a peripheral bus, an accelerated graphics port, and so forth. The bus(es) 1118 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1104 of the mobile robot(s) 1100 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1104 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1104 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1120 may include removable storage and/or non-removable storage including, but not limited to, magnetic storage, optical disk storage, and/or tape storage. The data storage 1120 may provide non-volatile storage of computer-executable instructions and other data. The memory 1104 and the data storage 1120, removable and/or non-removable, are examples of computer-readable storage media (CRSM) as that term is used herein.

The data storage 1120 may store computer-executable code, instructions, or the like that may be loadable into the memory 1104 and executable by the processor(s) 1102 to cause the processor(s) 1102 to perform or initiate various operations. The data storage 1120 may additionally store data that may be copied to the memory 1104 for use by the processor(s) 1102 during the execution of the computer-executable instructions. Moreover, output data generated as a result of execution of the computer-executable instructions by the processor(s) 1102 may be stored initially in the memory 1104, and may ultimately be copied to the data storage 1120 for non-volatile storage.

More specifically, the data storage 1120 may store one or more operating systems (O/S) 1122; one or more database management systems (DBMS) 1124; and one or more program module(s), applications, engines, computer-executable code, scripts, or the like. Some or all of these module(s) may be sub-module(s). Any of the components depicted as being stored in the data storage 1120 may include any combination of software, firmware, and/or hardware. The software and/or firmware may include computer-executable code, instructions, or the like that may be loaded into the memory 1104 for execution by one or more of the processor(s) 1102. Any of the components depicted as being stored in the data storage 1120 may support functionality described in reference to corresponding components named earlier in this disclosure.

The data storage 1120 may further store various types of data utilized by the components of the mobile robot(s) 1100. Any data stored in the data storage 1120 may be loaded into the memory 1104 for use by the processor(s) 1102 in executing computer-executable code. In addition, any data depicted as being stored in the data storage 1120 may potentially be stored in one or more datastore(s) and may be accessed via the DBMS 1124 and loaded in the memory 1104 for use by the processor(s) 1102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1102 may be configured to access the memory 1104 and execute the computer-executable instructions loaded therein. For example, the processor(s) 1102 may be configured to execute the computer-executable instructions of the various program module(s), applications, engines, or the like of the mobile robot(s) 1100 to cause or facilitate various operations to be performed in accordance with one or more embodiments of the disclosure. The processor(s) 1102 may include any suitable processing unit capable of accepting data as input, processing the input data in accordance with stored computer-executable instructions, and generating output data. The processor(s) 1102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1102 may be capable of supporting any of a variety of instruction sets.

Referring now to other illustrative components depicted as being stored in the data storage 1120, the O/S 1122 may be loaded from the data storage 1120 into the memory 1104 and may provide an interface between other application software executing on the mobile robot(s) 1100 and the hardware resources of the mobile robot(s) 1100. More specifically, the O/S 1122 may include a set of computer-executable instructions for managing the hardware resources of the mobile robot(s) 1100 and for providing common services to other application programs (e.g., managing memory allocation among various application programs). In certain example embodiments, the O/S 1122 may control execution of the other program module(s). The O/S 1122 may include any operating system now known or which may be developed in the future including, but not limited to, any server operating system, any mainframe operating system, or any other proprietary or non-proprietary operating system.

The DBMS 1124 may be loaded into the memory 1104 and may support functionality for accessing, retrieving, storing, and/or manipulating data stored in the memory 1104 and/or data stored in the data storage 1120. The DBMS 1124 may use any of a variety of database models (e.g., relational model, object model, etc.) and may support any of a variety of query languages. The DBMS 1124 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the mobile robot(s) 1100 is a mobile device, the DBMS 1124 may be any suitable lightweight DBMS optimized for performance on a mobile device.

Referring now to other illustrative components of the mobile robot(s) 1100, the input/output (I/O) interface(s) 1106 may facilitate the receipt of input information by the mobile robot(s) 1100 from one or more I/O devices as well as the output of information from the mobile robot(s) 1100 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the mobile robot(s) 1100 or may be separate. The I/O devices may further include, for example, any number of peripheral devices such as data storage devices, printing devices, and so forth.

The I/O interface(s) 1106 may also include an interface for an external peripheral device connection such as universal serial bus (USB), FireWire, Thunderbolt, Ethernet port or other connection protocol that may connect to one or more networks. The I/O interface(s) 1106 may also include a connection to one or more of the antenna(e) 1130 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The mobile robot(s) 1100 may further include one or more network interface(s) 1108 via which the mobile robot(s) 1100 may communicate with any of a variety of other systems, platforms, networks, devices, and so forth. The network interface(s) 1108 may enable communication, for example, with one or more wireless routers, one or more host servers, one or more web servers, and the like via one or more networks.

The antenna(e) 1130 may include any suitable type of antenna depending, for example, on the communications protocols used to transmit or receive signals via the antenna (e) 1130. Non-limiting examples of suitable antennae may include directional antennae, non-directional antennae, dipole antennae, folded dipole antennae, patch antennae, multiple-input multiple-output (MIMO) antennae, or the like. The antenna(e) 1130 may be communicatively coupled to one or more transceivers 1112 or radio components to which or from which signals may be transmitted or received.

As previously described, the antenna(e) 1130 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1130 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1130 may be configured to transmit or receive radio frequency signals within any suitable frequency range forming part of the unlicensed portion of the radio spectrum.

The antenna(e) 1130 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1112 may include any suitable radio component(s) for—in cooperation with the antenna(e) 1130—transmitting or receiving radio frequency (RF) signals in the bandwidth and/or channels corresponding to the communications protocols utilized by the mobile robot(s) 1100 to communicate with other devices. The transceiver(s) 1112 may include hardware, software, and/or firmware for modulating, transmitting, or receiving—potentially in cooperation with any of antenna(e) 1130—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1112 may further include hardware, firmware, or software for receiving GNSS signals. The transceiver(s) 1112 may include any known receiver and baseband suitable for communicating via the communications protocols utilized by the mobile robot(s) 1100. The transceiver(s) 1112 may further include a low noise amplifier (LNA), additional signal amplifiers, an analog-to-digital (A/D) converter, one or more buffers, a digital baseband, or the like.

The sensor(s)/sensor interface(s) 1110 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1114 may be configured to output light and/or render content. The optional speaker(s)/microphone(s) 1116 may be any device configured to receive analog sound input or voice data.

It should be appreciated that the program module(s), applications, computer-executable instructions, code, or the like depicted in FIG. 11 as being stored in the data storage 1120 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the mobile robot(s) 1100, and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 11 may be implemented, at least partially, in hardware and/or firmware across any number of devices.

It should further be appreciated that the mobile robot(s) 1100 may include alternate and/or additional hardware, software, or firmware components beyond those described or depicted without departing from the scope of the disclosure. More particularly, it should be appreciated that software, firmware, or hardware components depicted as forming part of the mobile robot(s) 1100 are merely illustrative and that some components may not be present or additional components may be provided in various embodiments.

While various illustrative program module(s) have been depicted and described as software module(s) stored in the data storage 1120, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-10 may be performed by a device having the illustrative configuration depicted in FIG. 11, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms.

The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method to implement preferred pathways at an autonomous mobile robot, the method comprising:

determining, by one or more computer processors coupled to memory, a preferred pathway for the autonomous mobile robot, the preferred pathway indicative of a preferred route between two locations;

receiving data associated with the preferred pathway at the autonomous mobile robot;

generating an influence function for the preferred pathway, the influence function being representative of an amount of bias towards the preferred pathway on a motion planning decision of the autonomous mobile robot, wherein the amount of bias being is based at least in part on a current distance between the autonomous mobile robot and the preferred pathway;

generating a planned path based at least in part on the influence function; and causing the autonomous mobile robot to move from a start point to an end point along the planned path.

2. The method of claim 1, wherein the motion planning decision is based at least in part on an initial cost function, the initial cost function being configured to reduce a cost of travel for the autonomous mobile robot from the start point to the end point, and wherein the cost of travel is distance and time.

3. The method of claim 2, wherein generating the planned path based at least in part on the influence function comprises:

generating a derived cost function for the autonomous mobile robot based at least in part on the initial cost function and the influence function, the derived cost function being configured to modify the cost of travel by accounting for the amount of bias toward the preferred pathway; and generating an optimal planned path based at least in part on the derived cost function, the derived cost function including effects of the influence function.

4. The method of claim 3, wherein generating the derived cost function includes:

generating a function to reduce the cost of travel as the distance of the autonomous mobile robot from the preferred pathway decreases.

5. A method comprising:

obtaining, via at least one of a user interface and a corresponding Application Programming Interface (API) call, at least one preferred pathway for an autonomous mobile robot;

transmitting the at least one preferred pathway to the autonomous mobile robot;

generating a planned path for the autonomous mobile robot based at least in part on an influence function, the influence function being representative of an amount of bias towards the at least one preferred pathway on a motion planning decision of the autonomous mobile robot, wherein the amount of bias is based at least in part on a current distance between the autonomous mobile robot and the at least one preferred pathway; and causing the autonomous mobile robot to move from a start point to an end point along the planned path.

6. The method of claim 5, wherein the metric associated with the at least one preferred pathway is a distance of the autonomous mobile robot to the at least one preferred pathway.

7. The method of claim 5, further comprising:

generating the influence function for the at least one preferred pathway; and transmitting the influence function to the autonomous mobile robot.

8. The method of claim 5, wherein the motion planning decision is based at least in part on one or more of: (i) an initial cost function, the initial cost function being configured to reduce a cost of travel for the autonomous mobile robot from the start point to the end point, and wherein the cost of travel is distance and/or time, wherein the cost is increased as distance from the preferred pathway is increased, or the cost is decreased as distance from the preferred pathway is increased.

9. The method of claim 8, wherein generating the planned path further includes:
    generating a derived cost function for the autonomous mobile robot based at least in part on the initial cost function and the influence function, the derived cost function being configured to modify the cost of travel by accounting for the amount of bias toward the at least one preferred pathway; and
    generating an optimal planned path based at least in part on the derived cost function, the derived cost function including effects of the influence function.

10. The method of claim 9, wherein generating the derived cost function includes:
    generating a function to reduce the cost of travel as the distance of the autonomous mobile robot from the at least one preferred pathway decreases.

11. The method of claim 9, wherein generating the derived cost function includes:
    in response to the motion of the autonomous mobile robot being aligned in a direction of the at least one preferred pathway, generating a function to reduce the cost of travel as the distance of the autonomous mobile robot from the at least one preferred pathway decreases, thereby biasing the autonomous mobile robot towards the at least one preferred pathway; and
    in response to the motion of the autonomous mobile robot being in an opposite direction to the at least one preferred pathway, generating a function to increase the cost of travel as the distance of the autonomous mobile robot from the at least one preferred pathway decreases, thereby biasing the autonomous mobile robot away from the at least one preferred pathway.

12. The method of claim 5, wherein the at least one preferred pathway is bidirectional, and wherein the at least one preferred pathway being bidirectional indicates that the influence function is not affected by relative orientation of movement of the autonomous mobile robot with respect to the at least one preferred pathway.

13. The method of claim 5, wherein the at least one preferred pathway is unidirectional, and wherein the at least one preferred pathway being unidirectional indicates that the influence function is affected by relative orientation of movement of the autonomous mobile robot with respect to the at least one preferred pathway, and orientation of the autonomous mobile robot.

14. The method of claim 5, wherein causing the autonomous mobile robot to move from the start point to the end point along the planned path comprises:
    causing the autonomous mobile robot to move from the start point to the end point in one direction along the planned path.

15. The method of claim 5, wherein causing the autonomous mobile robot to move from the start point to the end point along the planned path comprises:
    causing the autonomous mobile robot to move from the start point to the end point in a first direction along the planned path; and
    causing the autonomous mobile robot to move from the start point to the end point in a second direction along the planned path.

16. The method of claim 5, wherein obtaining at least one preferred pathway for the autonomous mobile robot comprises:
    obtaining a series of connected segments on a visual representation of an environment, the series of connected segments being input by the user via the web user interface.

17. The method of claim 5, wherein the at least one preferred pathway includes one or more of: (i) a concatenation of the series of the connected segments, or (ii) a geometric area in which the autonomous mobile robot can move.

18. A system for implementing a planned track from a start point to an end point for an autonomous mobile robot, the system comprising:
    a user interface that enables a user to define a preferred pathway for a warehouse;
    a server communicably coupled to the user interface, the server configured to execute computer-executable instructions to:
        obtain the preferred pathway from the web user interface; and
        generate an influence function for the preferred pathway, wherein the influence function represents an amount of bias to the preferred pathway, and wherein the amount of bias is based at least in part on a current distance between the autonomous mobile robot and the preferred pathway; and
    an autonomous mobile robot communicably coupled to the server, the autonomous mobile robot configured to:
        receive the influence function from the server;
        generate the planned track based at least in part on the influence function; and
        move from the start point to the end point within the warehouse on the planned track.

19. The system of claim 18, wherein the autonomous mobile robot is configured to generate the planned track based at least in part on the influence function by:
    generating a derived cost function based at least in part on the influence function; and
    generating an optimal planned track using the derived cost function.

20. The system of claim 19, wherein the autonomous mobile robot is configured to generate the derived cost function based at least in part on the influence function by:
    generating a function to reduce the cost of travel as the distance of the autonomous mobile robot from the at least one preferred pathway decreases.

* * * * *